July 31, 1956  J. D. RUSSELL  2,756,868
REPLACEABLE FLIGHT CONVEYOR CHAIN
Filed Nov. 21, 1950  3 Sheets-Sheet 1

Inventor:
John D. Russell.
by
Ami A. Maxon.
Attorney.

July 31, 1956　　　J. D. RUSSELL　　　2,756,868
REPLACEABLE FLIGHT CONVEYOR CHAIN
Filed Nov. 21, 1950　　　3 Sheets-Sheet 2

Inventor:
John D. Russell.
by Louis A. Maxson
Attorney.

July 31, 1956  J. D. RUSSELL  2,756,868
REPLACEABLE FLIGHT CONVEYOR CHAIN
Filed Nov. 21, 1950  3 Sheets-Sheet 3
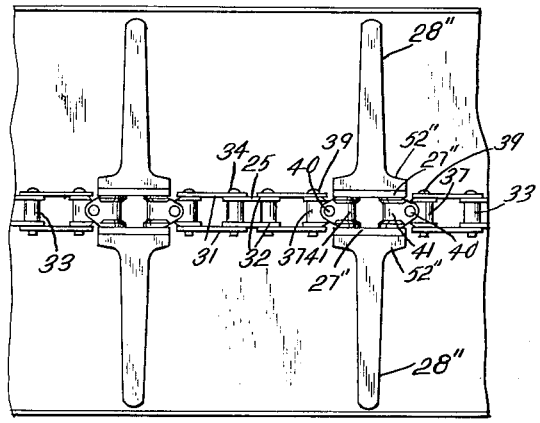
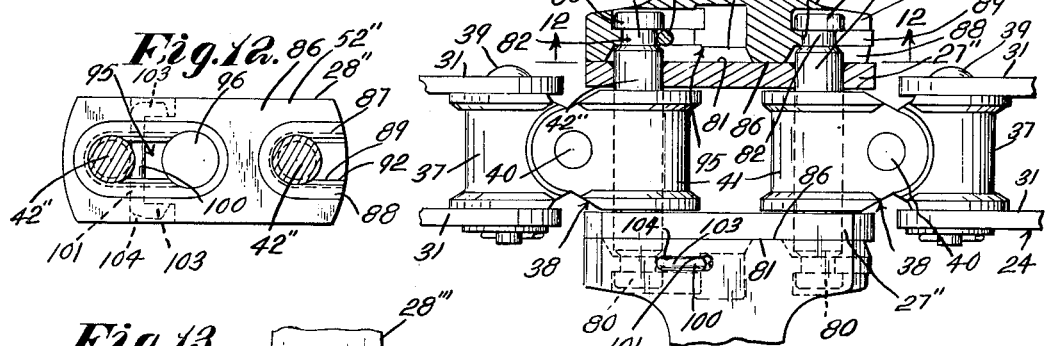
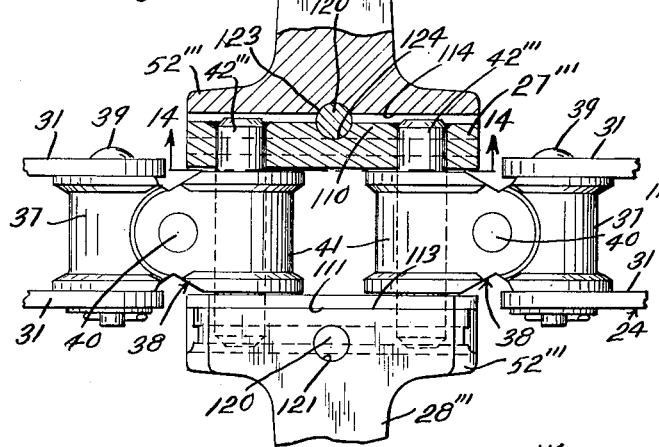
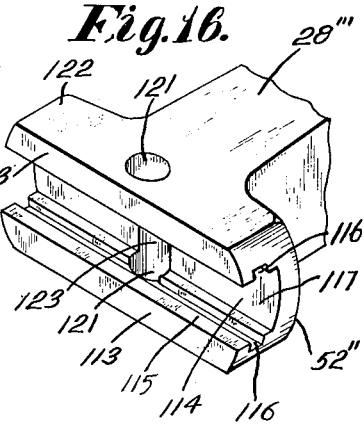
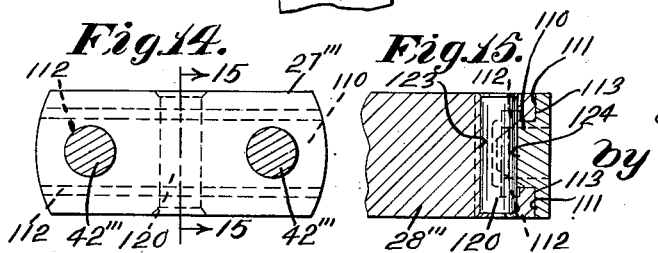
Inventor:
John D. Russell.
by
Louis A. Maxam,
Attorney.

United States Patent Office 2,756,868
Patented July 31, 1956

2,756,868
REPLACEABLE FLIGHT CONVEYOR CHAIN

John D. Russell, Franklin, Pa., assignor to Joy Manufacturing Company, Pittsburgh, Pa., a corporation of Pennsylvania Application November 21, 1950, Serial No. 196,856

1 Claim. (Cl. 198—176)

This invention relates to conveyor chains, and particularly to such chains of the flight type with center chain.

Conveyor chains comprising a central chain with flights extending oppositely from the opposite sides of the center chain are widely used for the conveying of material. In some uses, such as on loading machines, the flights are required to move very heavy masses of material, such as large lumps of iron ore, large lumps of coal, etc. These large lumps are pushed along deck plates by the flights, which move close to, or frequently in actual contact with, the deck plates. If the point of engagement of a flight with one of the heavy masses which it moves along the deck plates happens to be near its free end, very heavy bending stresses are imposed on the flights. When loading from the bottom of a pile, large pieces of material frequently may drop from above onto the flights. It will, therefore, be appreciated that bending of the flights, or actual breakage of the flights, is not an uncommon incident. Need for replacement of flights must therefore be anticipated.

It is desirable that the conveyor chain have the chain portion thereof as strong as possible and that it be not necessary to remove and replace any actual element of the chain proper in replacing a flight. It is further desirable, since flights should be replaceable, but at the same time strongly secured to the chain proper, that rugged connections permitting ready detachment and replacement of flights, but inherently supporting the flights very solidly upon the chain, be provided.

It is an object of the present invention to provide an improved conveyor chain. It is another object of the invention to provide an improved conveyor chain of the flight type having replaceable flight elements. It is a further object of the invention to provide improved connecting means between replaceable flights and a flight moving chain. It is still another object of my invention to provide improved flight structures per se. Other objects and advantages of the invention will hereinafter more fully appear.

In the accompanying drawings, in which several embodiments which the invention may, from its various aspects, assume in practice are shown for purposes of illustration:

Fig. 10 is a view similar to Figs. 1 and 5 showing another modified form of construction;

Fig. 11 is a view similar to Figs. 2 and 6 showing on an enlarged scale, and with parts broken away, the chain and flight construction of Fig. 10;

Fig. 12 is a longitudinal section on the plane of the line 12—12 of Fig. 11;

Fig. 13 is a view similar to Figs. 2, 6 and 11 showing a further modified form of construction;

Fig. 14 is a section on the plane of the line 14—14 of Fig. 13;

Fig. 15 is a section on the plane of the line 15—15 of Fig. 14;

Fig. 16 is a perspective view on an enlarged scale of the attachment end of one of the flight elements of the embodiment of Fig. 13.

Figure 1:
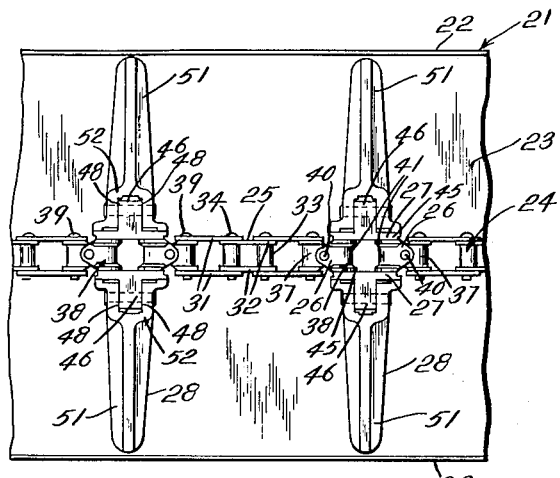
Fig. 1 is a fragmentary top view of a portion of a flight conveyor chain and its associated trough.
Figure 2:
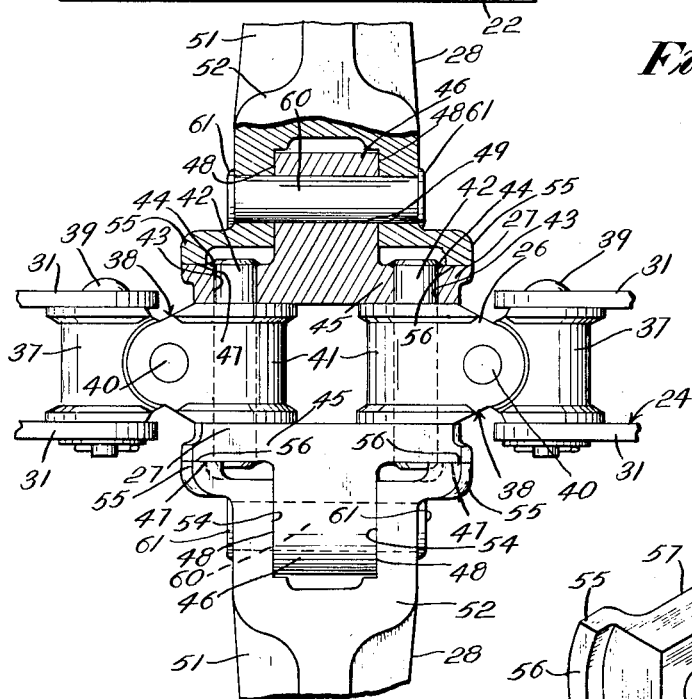
Fig. 2 is an enlarged view, with parts broken away, showing one embodiment of the invention.
Figure 4:
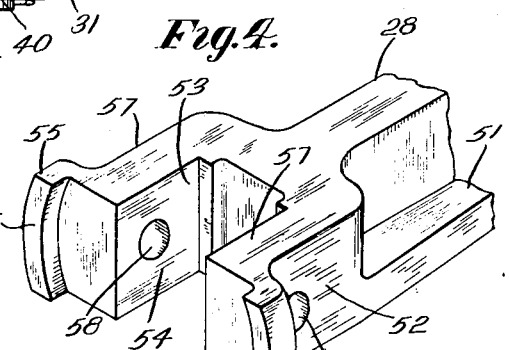
Fig. 4 is a fragmentary perspective view on the same scale as Fig. 3, showing the attachment end of a flight element adapted to be associated with the chain link element of Fig. 3.

Figs. 1 to 4 inclusive illustrate one embodiment of the present invention. Referring first to Fig. 1, it will be observed that a conveyor trough 21 has side flanges 22 and a deck plate 23, and a conveyor chain, generally designated 24, is adapted to traverse the surface of the deck plate 23 and move material along it. The chain 24 includes, as illustrated, sections of plain roller chain, these sections being numbered 25, and having universal connections 26 with mountings, in the form of special chain link elements 27, for flights 28. The sections 25 are made up of cooperating link elements 31 and 32, rollers 33, and connecting pins 34. At each end of a section 25, an element 37 of a universal joint connection 38 is connected by a horizontal pin 39 to a pair of link elements 31. A vertical pin 40 connects the universal joint element 37 with another universal joint element 41. The universal joint elements 41 are pivotally mounted on pins 42 which extend through openings 43 in the flight mounting chain link elements 27, the pins 42 being suitably permanently attached to the elements 27 at 44 as by welding.

Figure 3:
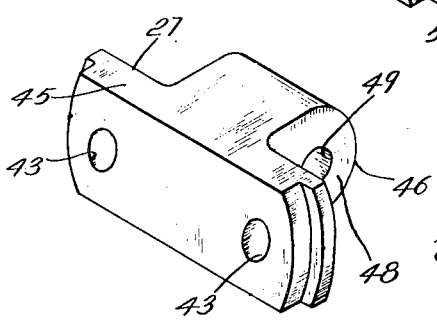
Fig. 3 is a further enlarged, perspective view of a side link chain element.

The flight mounting chain link elements 27 will be noted, referring to Fig. 3, to consist of link portions proper 45 carrying lugs 46 at their outer sides and, as shown, midway between their ends. Support surfaces 47 are formed at the opposite ends of the portions 45, being herein shown as plane and lying in a common plane parallel to the axes of the pins 42, and the lug portion 46 has opposite parallel plane surfaces 48 at its opposite ends. A pin-receiving bore 49 extends through the lug portion 46, with its axis in the same plane with the axes of the pins 42 and perpendicular to the surfaces 48, 48. The flights 28, which may have their material-moving portions 51 of any suitable cross section, have enlarged attachment portions 52 each providing a recess 53 having parallel walls 54 adapted to engage the surfaces 48, and each having flange portions 55 providing surfaces 56 adapted to seat against the support surfaces 47, the flange portions 55 and the walls 54 being upon spaced arms 57 lying at opposite sides of the recess 53. The arms 57 are traversed by pin-receiving openings 58. The axes of these openings are alined, and are spaced from the plane in which the surfaces 56 lie, a distance equal to the distance from the axis of the opening 49 to the plane of the support surfaces 47. When the parts are assembled, the lug 46 is received in the recess 53, the walls 54 closely engaging the surfaces 48 on the lug 46, and the surfaces 56 engaging the surfaces 47, and a pin 60, herein shown as headed over at its opposite ends at 61, snugly fitting the alined openings 58, 49 and 58, and rigidly holding the lug in position. It will be evident that by reason of the contacts of the surfaces 56 and 47, and of the surfaces 54 and walls 48, and the snug fit of the pin 60 in the three openings, a very strong connection between the flights and the mounting links 27 is provided. If, however, a flight be bent or broken, it is necessary only to cut away enough of the headed over portion 61 of a pin 60 to permit the pin to be driven out; and a new flight may then be mounted in position and a pin—a new one if desirable— may be put in place and again headed over to hold the new flight in position.

Turning now to the embodiment of the invention shown in Figs. 5 to 9, it will be observed that in this instance there is provided, instead of the arrangement of Figs. 1 to 4, one in which the flights are slid transversely to the flight mounting chain link elements to effect assembly, and in which an interlocking dovetail or undercut connection between the flight and the link element is provided to insure rigid holding.

Figure 5:
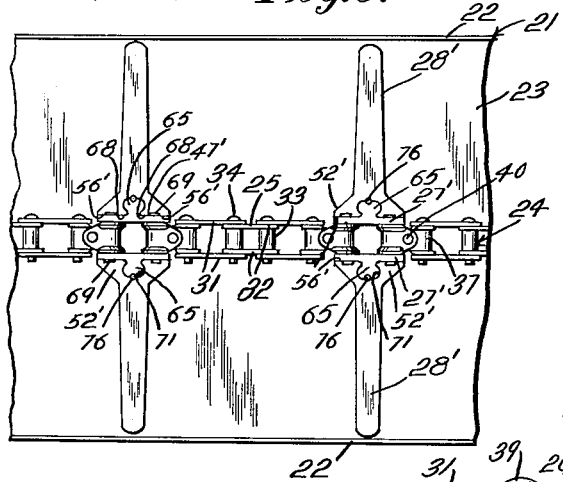
Fig. 5 is a view similar to Fig. 1 showing a modified construction.
Figure 6:
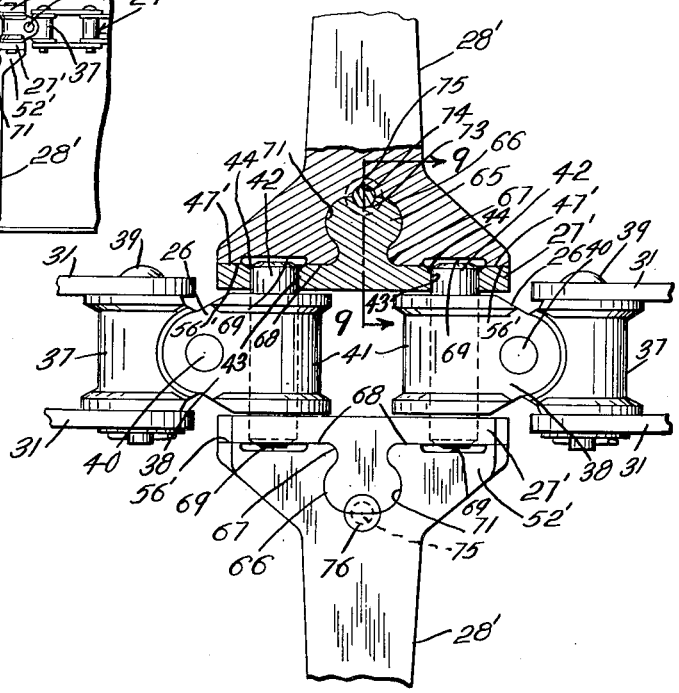
Fig. 6 is a view on an enlarged scale and similar to Fig. 2 but showing the modified construction illustrated in Fig. 5.
Figure 7:
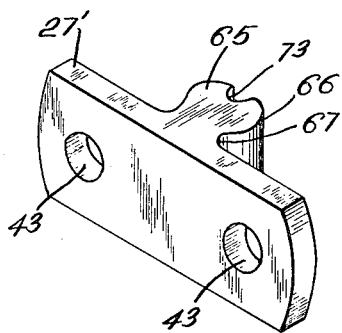
Fig. 7 is a view corresponding to Fig. 3 showing a side link chain element.
Figure 9:
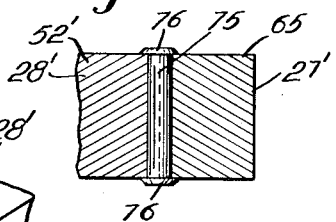
Fig. 9 is a fragmentary sectional view on the same scale as Figs. 7 and 8, but taken on the plane of the line 9—9 of Fig. 6.
Figure 8:
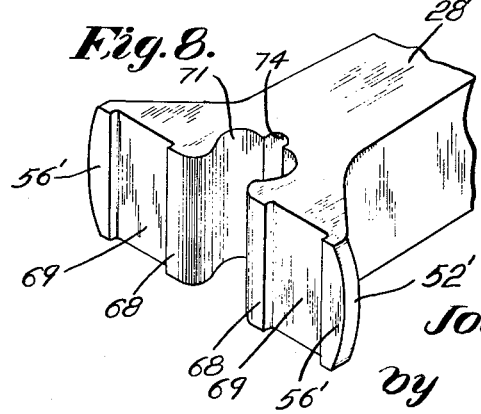
Fig. 8 is a view corresponding to Fig. 4 showing the inner end of a flight element adapted to be secured to the chain link element of Fig. 7.

The structure of the chain proper, as illustrated in Fig. 5, is the same as that shown in Fig. 1 except for the changed shape of the flight mounting chain link elements 27'. The elements 27' are provided with a transversely extending projection or lug 65, which is generally rounded as at 66, and which is necked down as at 67 so as to provide a dovetail or keying action in its cooperation with the flight element 28'. The member 27' has plane support surfaces 47' of substantial extent at the opposite sides of the lug 65. The flight 28' has a widened inner end 52'. This has surface portions 56', 56', and parallel surface portions 68, 68, all lying in a common plane and adapted to engage one of the surfaces 47', there being transverse grooves 69 between each surface 56' and the adjacent surface 68 to allow for the reception of the projecting ends of the pin elements 42. The portion 52' is recessed at 71 for the snug reception of the transverse lug portion 65, and the latter, and the portion 52', are each traversed by grooves, respectively designated 73 and 74, which cooperate to form a cylindrical bore, in the assembled relation of the parts, for the reception of a holding pin 75, which is headed over as at 76 to hold it in the bore and to hold a link element 27' and a flight 28' together. Here it will be observed that the parts are again slidably connected, and that they are very rigidly held together by the dovetail action of the lug 65 in the recess 71 and by the engagement of the support surfaces 56' and 68 with the surfaces 47'.

Turning now to the embodiment of Figs. 10, 11 and 12, it will be observed that in this embodiment the flights 28" are adapted to be held against the chain link elements 27" by means of undercut recesses in which head portions 80 formed on pins 42" of extended length are received. The pins 42" are welded to the elements 27", and the elements 27" are plane throughout their entire outer surfaces 81, and the pins 42", which are welded to the elements 27", extend substantially outwardly from the outer surfaces 81 of these elements, and have circumferential grooves at 82 spaced from their ends so that the heads 80 are of greater diameter than the reduced portions 84 produced by the grooves 82. The enlarged portions 52" of the flights 28" each have a flat surface 86 adapted to engage with the surface 81. The portions 52" are elongated as shown in Fig. 12, and are similar in width, as well as in length, to the members 27". At one end, desirably at the rearward end (in terms of travel in use of the flights), there is milled a recess 87 having a parallel-walled inner portion 88, comparable in width to the full diameter of the pin 42", a narrower parallel walled portion 89 comparable in width to the diameter of the neck portion 84 of the pin, and a wider portion 90 comparable in width to the head 80 of the pin 42". These recesses are formed at their "forward" ends on appropriate arcs. Desirably, the arc 91 at the forward end of the recesses 89 conforms substantially in curvature to the curvature of the surface of the neck portion 84 of the pin 42". This arrangement results in the provision of a U-shaped flange 92 adapted to be received in the groove 82. Near the other end of the enlarged portion 52" there is a recess arrangement adapted to cooperate with the other one of the pins 42" which pass through the cooperating link element 27". This recess arrangement, generally designated 95, is closed at its "forward" end and corresponds in cross section to the recess arrangement at the other end of the head portion 52". Access to this recess arrangement 95 is through an enlarged opening 96 of slightly greater diameter than the overall diameter of the pin 42" whose head is to be received in it. It will be understood that in the assembly of this arrangement the flight 28" will have its enlarged face 81, but with the opening 96 overlying the left hand portion 52" positioned with a face 86 in contact with a face 81, but with the opening 96 overlying the left hand pin 42" in Fig. 11. Then the entire flight 28" may be slid to the right until the position shown in Fig. 11 is attained. The parts may be held in this assembled relation by a cross pin 100 extending through openings 101 in the portion 52" and traversing the recesses 95 and having its ends 103 bent over into side recesses 104 formed in the head 52". It will be evident that, in the form of the invention just described, the flight 28" will be slid into position and locked in its assembled relation, and that the cooperation of the flange 92 with the heads 80 of the pins 42", will hold the parts solidly together, while the abutment of the stock of the head portion 52" at the forward ends of the recesses with the outer ends of the pins 42" will prevent longitudinal movement of the flights relative to their supports.

The last form of the invention which is shown for purposes of illustration is the one of Figs. 13–16. So far as the chain structure per se is concerned, again the only difference consists in the modified form of the link elements 27'''. These, held, as in the other forms, by welding to pins 42''', which pins are similar to the pins of the first and second species described, are herein shown as having longitudinally extending, outwardly projecting rib or lug portions 110 lying between spaced, longitudinally extending, plane support surfaces 111. These rib or lug portions 110 have longitudinally extending side ribs 112 formed on them outward of the surfaces 111 but inward of the outermost surface of the portions 110. The flights 28''' have attachment portions 52'''. These have longitudinally extending plane surfaces 113 adapted to engage the surfaces 111 previously mentioned. The heads are further grooved longitudinally as at 114, and the side walls 115 of the grooves 114 are further grooved as at 116 to receive the side ribs 112. The deepest portions 117 of the grooves 114 are provided to afford clearance for the reception of the projecting ends of the pins 42'''. It will be evident that to assemble the flights on a chain the grooved attachment portions 52''' are slid onto the members 27''', the side ribs 112 being received in the recesses 116 and the surface 113 engaging the surface 111. To hold the parts assembled, a pin 120 is extended transversely through openings 121 formed in the side walls 115 provided by the formation of the grooves 114, the pin 120 being received at its central portion in an arcuate recess 123 at the bottom of groove 114, and in an arcuate groove 124 extending transversely of the lug or rib 110. Obviously, the parts of this device may also be assembled by a sliding movement, and yet a very rigid construction results, and all that is necessary to do is to drive out the pin 120 if a flight is broken, or bent beyond repair, in order that a new flight may be substituted.

In all of the forms of the invention shown for purposes of illustration, it will be appreciated that the holding means includes not only pin devices for preventing accidental separation of the parts, but also abutment surfaces and support surfaces cooperating in providing a very rugged and rigid connection. In a number of the embodiments it will be observed that the flights at their attachment ends are provided with what may be termed hooked ends.

While there are in this application specifically described four forms which the invention may assume in practice, it will be understood that these forms of the same are shown for purposes of illustration and that the invention may be further modified and embodied in still other forms without departing from its spirit or the scope of the appended claim.

What I claim as new and desire to secure by Letters Patent is:

In a conveyor chain, link elements spaced apart to receive a sprocket tooth between them, pivot pins passing through said elements and projecting from the opposite sides thereof, side links one at each side of said link elements and traversed near their opposite ends by said pivot pins, said pins fixedly holding said side links and link elements together, and a pair of mutually alined conveyor flights extending outwardly from the opposite sides of said chain in substantial parallelism with said pivot pins and each having individual to it detachable connections with one of said side links, the detachable connections of said flights with said side links including tongue and groove connection in planes extending transverse to the axes of said pins and connectible and disconnectible by sliding movement lengthwise of said side links, said tongue and groove connections of opposite flights closer to each other than the ends of said pins.

References Cited in the file of this patent

UNITED STATES PATENTS

| | | |
|---|---|---|
| 231,186 | Neacy | Aug. 17, 1880 |
| 728,972 | Pittman | May 26, 1903 |
| 1,113,309 | Coldren | Oct. 13, 1914 |
| 1,770,650 | Levin | July 15, 1930 |
| 2,276,978 | Hyman | Mar. 17, 1942 |
| 2,381,519 | Russell | Aug. 7, 1945 |
| 2,435,768 | Biggs | Feb. 10, 1948 |
| 2,450,501 | Clarkson | Oct. 5, 1948 |
| 2,544,191 | Tomfohrde | Mar. 6, 1951 |

FOREIGN PATENTS

| | | |
|---|---|---|
| 203,970 | Germany | Aug. 1, 1905 |
| 218,065 | Great Britain | July 3, 1924 |